US008543741B2

(12) United States Patent  (10) Patent No.: US 8,543,741 B2
Reynolds et al.  (45) Date of Patent: Sep. 24, 2013

(54) NETWORK SCANNING AND MANAGEMENT IN A DEVICE TYPE MANAGER OF TYPE DEVICE

(75) Inventors: Connor W. Reynolds, Marshalltown, IA (US); Michael J. Tewes, Marshalltown, IA (US); Mahesh Gade, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 455 days.

(21) Appl. No.: 12/192,874

(22) Filed: Aug. 15, 2008

(65) Prior Publication Data

US 2009/0049207 A1  Feb. 19, 2009

Related U.S. Application Data

(60) Provisional application No. 60/956,328, filed on Aug. 16, 2007.

(51) Int. Cl.
*G06F 3/00* (2006.01)
*G06F 15/177* (2006.01)

(52) U.S. Cl.
USPC ............................................ 710/16; 709/220

(58) Field of Classification Search
USPC ......................................................... 710/16
See application file for complete search history.

(56) References Cited

U.S. PATENT DOCUMENTS

| | | | | |
|---|---|---|---|---|
| 6,633,782 | B1* | 10/2003 | Schleiss et al. | 700/26 |
| 7,098,771 | B2* | 8/2006 | Lefebvre et al. | 340/286.02 |
| 7,110,843 | B2* | 9/2006 | Pagnano et al. | 700/108 |
| 2007/0067512 | A1* | 3/2007 | Donaires et al. | 710/62 |
| 2007/0077665 | A1* | 4/2007 | Bump et al. | 438/14 |
| 2007/0078540 | A1* | 4/2007 | Bump et al. | 700/90 |
| 2007/0078956 | A1* | 4/2007 | VanGompel | 709/220 |
| 2007/0079250 | A1* | 4/2007 | Bump et al. | 715/762 |
| 2009/0210692 | A1* | 8/2009 | Wittmer et al. | 713/150 |
| 2009/0234465 | A1* | 9/2009 | Korsten | 700/17 |
| 2009/0326852 | A1* | 12/2009 | Vetter et al. | 702/108 |

FOREIGN PATENT DOCUMENTS

| | | |
|---|---|---|
| EP | 1 770 459 A2 | 4/2007 |
| JP | 2005-072964 A | 3/2005 |

OTHER PUBLICATIONS

FDT Interface Specification, 2001, FDT-Joint Interest Group, Ver. 1.2, pp. 1-318.*
Joint Interest Group, "FDT-Joint Interest Group Guideline; FDT Interface Specification," Version 1.2.1, p. 1-384 (2005).
Wollschlaegar et al., "Integration of Fieldbus Systems into On-line Asset Management Solutions based on Fieldbus Profile Descriptions," Factory Communication Systems, p. 89-96 (2002).
International Search Report and Written Opinion for Application No. PCT/US2008/073373, dated Mar. 12, 2009.
Takeuchi, "New Field Device Management Tool Framework FDT/DTM," Yokogawa Technical Report, 51 (2):49-52 (2007).
Office Action for Japanese Application No. 2010-521209, dated Jul. 17, 2012.

* cited by examiner

*Primary Examiner* — Henry Tsai
*Assistant Examiner* — Titus Wong (57) ABSTRACT

A method of communicating with a device using a Field Device Tool (FDT) framework, such that the device operates in a process control environment and is communicatively coupled to a communication link, includes generating an instance of a scan capable device type manager (DTM) of type device that represents the device in the FDT framework, communicatively connecting the instance of the scan capable DTM to a communication channel which corresponds to the communication link, scanning the communication link to discover the device using the instance of the scan capable DTM, and obtaining an address of the discovered device at the scan capable DTM.

23 Claims, 8 Drawing Sheets

NETWORK SCANNING AND MANAGEMENT IN A DEVICE TYPE MANAGER OF TYPE DEVICE

CROSS REFERENCE TO RELATED APPLICATION

This application claims the benefit of U.S. Provisional Patent App. No. 60/956,328 entitled "Network Scanning and Management in a Device Type Manager of Type Device," filed Aug. 16, 2007, the disclosure of which is hereby expressly incorporated herein by reference.

FIELD OF TECHNOLOGY

The present disclosure relates generally to managing devices in a process control environment and, in particular, to a scanning function of a Device Type Manager (DTM) operating in a Field Device Tool (FDT) framework.

DESCRIPTION OF THE RELATED ART

Process control systems, like those used in chemical, petroleum or other processes, typically include one or more centralized or decentralized process controllers communicatively coupled to at least one host or operator workstation and to one or more process control and instrumentation devices such as, for example, field devices, via analog, digital or combined analog/digital buses. Field devices, which may be, for example, valves, valve positioners, switches, transmitters, and sensors (e.g., temperature, pressure, and flow rate sensors), are located within the process plant environment, and perform functions within the process such as opening or closing valves, measuring process parameters, increasing or decreasing fluid flow, etc. Smart field devices such as field devices conforming to the well-known protocols such as FOUNDATION™ Fieldbus, Device-Net™, or HART®, may also perform control calculations, alarm functions, and other control functions commonly implemented within the process controller.

The process controllers, which are typically located within the process plant environment, receive signals indicative of process measurements or process variables made by or associated with the field devices and/or other information pertaining to the field devices, and execute controller applications. The controller applications implement, for example, different control modules that make process control decisions, generate control signals based on the received information, and coordinate with the control modules or blocks in the field devices such as HART® and Fieldbus field devices. The control modules in the process controllers send the control signals over the communication lines or signal paths to the field devices, to thereby control the operation of the process.

Information from the field devices and the process controllers is typically made available to one or more other hardware devices such as, for example, operator workstations, maintenance workstations, personal computers, handheld devices, data historians, report generators, centralized databases, etc. to enable an operator or a maintenance person to perform desired functions with respect to the process such as, for example, changing settings of the process control routine, modifying the operation of the control modules within the process controllers or the smart field devices, viewing the current state of the process or status of particular devices within the process plant, viewing alarms generated by field devices and process controllers, simulating the operation of the process for the purpose of training personnel or testing the process control software, diagnosing problems or hardware failures within the process plant, etc.

The recent introduction of the Fieldbus technology and of the related standards to the process control industry has made it possible to connect field devices, process controllers, multiplexers, workstations, and other equipment of a plant into a single network. Generally speaking, Fieldbus provides a foundation for real-time distributed control by allowing multiple devices to connect to a single pair of wires which may, in turn, connect to a controller, a computer host, or other intelligent host. However, the effectiveness of Fieldbus is significantly limited by a large number of protocol standards specifying Fieldbus communications. For example, currently there exist such competing Fieldbus protocols as Foundation Fieldbus (FF) and Profibus, for example, in addition to other types of communication protocols such as HART® or CAN. Moreover, there is a large number of operational legacy 4-20 mA devices which require additional hardware to connect to a Fieldbus line.

A large number of manufacturers produce field devices and other process control hardware components which are typically compliant with only some of the existing protocols. Moreover, devices frequently require specific configuration and parameterization, and each manufacturer may impose further configuration requirements. Thus, operators and maintenance personnel frequently require a large number of protocol-, manufacturer-, and device-specific tools in order to communicate with the devices and perform configuration, diagnostic, and maintenance functions. As a result, operator workstations or portable devices may contain numerous incompatible tools and operators may spend a significant amount of time mastering and selectively applying these tools to a specific limited part of the process control network or to a limited aspect of the operation of the network.

There has been a move, in the recent years, to address the problem of inconsistency of process data, documentation, device configuration, and Human-Machine Interface (HMI) by introducing the Field Device Tool (FDT) specification. FDT seeks to provide end users with a unified way of communicating with the heterogeneous field devices and other process control components by defining various interfaces and a single software framework. In particular, a joint interest group including many major manufacturers has agreed on a series of interface definitions available to the public and has selected a software platform for developing various high-level applications. Additional information about FDT may be found at www.fdt-jig.org. While FDT itself does not provide any ready-made tools, FDT provides a toolset for developing so-called framework applications for such diverse purposes as asset management, device configuration, or process control simulation and diagnostics.

FDT relies on several well-established standards and technologies in order to allow framework applications to run on Microsoft Windows-based computers. Specifically, FDT relies on Microsoft's Component Object Model (COM) for language-independent, object-oriented development, on Extensible Markup Language (XML) for data exchange, and on the ActiveX technology for graphical interface definition. As one familiar with the Microsoft Windows® environment will recognize, COM enables dynamic object creation and enables inter-process communication irrespective of the programming language. Further, COM objects expose their functionality and attributes through well-defined interfaces. For the purposes of providing Graphical User Interface (GUI), the FDT standard enforces the use of ActiveX. In one aspect, Microsoft's ActiveX is an extension of the COM standard directed specifically to graphical, user input, and data exchange interfaces in the Windows environment. Finally, FDT uses XML, an open standard widely used in many industries and applications, for data definition. XML provides lexical rules which define, through a set of tags, the types and boundaries of data structures. As one familiar with such related fields as web development will recognize, properly formed XML documents are readable by both humans and machines. Importantly, XML also allows for easy extension by means of user-specified tags.

FDT uses XML in order to define communication rules between objects such as an FDT framework application and a Device Type Manager (DTM), for example. A DTM is a software component containing device-specific application software. In accordance with general COM principles, a DTM is a binary object with a set of interfaces conforming to the rules of the FDT framework. Typically, a device manufacturer provides a DTM for a specific device type so that the DTM may plug into a process control application, asset control management software, or other type of FDT application being developed. This DTM contains user dialogues and interfaces, rules for the corresponding device, and, in many cases, help content for an application which may refer to the device.

DTMs vary in complexity according to the type of device or the hardware type the DTMs represent in the FDT environment. Each manufacturer may choose to implement DTMs differently but, at the very least, each DTM implements the mandatory interfaces. Some manufactures may additionally provide sophisticated calibration, diagnostic, test, and maintenance functions as part of a DTM. Furthermore, some manufactures provide multilingual support in a DTM to facilitate smooth integration of the DTM into any FDT framework application.

There are several types of DTM objects used by FDT framework applications. For example, a DTM of type device (referred to herein as "device DTM") represents a field device while a communication DTM corresponds to a module with direct access to a communication resource. Thus, a DVC6000 series digital valve controller, sold by Emerson Process Management™, may be represented by a device DTM communicating, via the FDT interface, with a communication DTM representing a HART modem. More specifically, the framework application running on an operator workstation, for example, instantiates an object of a particular device DTM class and an object of a particular communication DTM class. In the FDT environment, a device DTM does not "know" the specifics of a protocol supported by a certain communication DTM while the communication DTM does not "know" the particulars of the device DTM. During a configuration, diagnostic, or other type of operation, the device DTM may send a command with the corresponding command parameters to the communication DTM and the communication DTM will, in turn, format the command according to the protocol requirements and propagate the data to the proper interface of the operator workstation. In short, a device DTM encapsulates device-specific functionality and a communication DTM encapsulates protocol-specific functionality. A device DTM may also communicate with the corresponding physical device using built-in channels of the framework application, or use both the built-in channels and the channel functionality provided by one or several communication DTMs.

Further, a gateway DTM provides routing between different protocols. For example, a gateway DTM may provide PROFIBUS-to-HART translation. In some cases, a gateway DTM may provide other functionality to facilitate the cooperation of field devices with communication hardware in addition to or instead of protocol translation. In certain implementations, a gateway DTM may be connected to a device DTM and a communication DTM. In other implementations, a gateway DTM may connect to two communication DTMs, each supporting a different protocol or a communication scheme. Still further, other DTM types may be developed for such needs as connecting an FDT application to an external application, for example.

The interfaces and functions provided by the existing FDT/DTM environment typically require that a separate DTM be instantiated for each physical device. Moreover, a device DTM can connect to only one communication channel of a communication DTM. Thus, while the FDT specification provides engineers and operators with a powerful set of software tools, developing and configuring FDT framework applications for large process control systems may be a time-consuming and difficult task. In particular, operators must configure each device DTM with the address of the corresponding physical device. Moreover, the configuration of each device must proceed separately even if multiple devices share many of the configuration parameters. For example, if several similar devices reside on a single FF H1 connection, each device DTM must be separately instantiated, configured with a proper physical address, and further configured prior to operating.

SUMMARY

A scan-capable device DTM module represents a device in an FDT environment and includes a scanning function which allows the DTM to identify and manage one or more devices of a specified type on a given communication channel. The scan-capable device DTM connects to a communication DTM and polls a target address range using the known commands of the protocol supported by the communication DTM. In one embodiment, the scan-capable device DTM detects either the presence or absence of a device at a particular address. In another embodiment, the scan-capable device DTM further obtains device specific information from each discovered device. The scan-capable device DTM eliminates the need to manually input the address of a physical device. Instead, the scan-capable device DTM discovers the matching physical devices automatically by scanning the allowable address range via one or several communication DTMs.

In another aspect, a single instance of a scan-capable device DTM may be used to simultaneously support multiple physical devices. Because the scan-capable device DTM is not restricted to a single physical address, the scan-capable device DTM may discover and store several device addresses and may maintain communication with several separate devices of the same type. In particular, an application external to FDT but working in cooperation with a particular FDT framework application may use a single instance of a scan-capable device DTM to establish a communication with several field devices.

In one aspect, the scan-capable device DTM conforms to the FDT specifications as defined by the joint interest group. In this respect, the scan-capable device DTM is fully compatible with FDT framework applications. In one embodiment, the scan-capable device DTM replaces the device DTM for a particular device and may be provided as a replacement DTM for a particular device by the device manufacturer. The replacement DTM may contain all of the functionality of a device DTM for the corresponding device and, additionally, a scanning function implemented according to the teachings of the present disclosure. In another embodiment, the scan-capable device DTM connects an application running outside the FDT framework to a communication DTM inside the FDT framework. The external application may already support the device-specific functionality and the scan-capable device DTM may provide the discovery function to the external application and may also serve as a connection between the external application and the FDT framework.

In one aspect, the scanning function of a scan-capable device DTM is programmed with the allowable range of device addresses associated with a particular channel. The scan-capable DTM is additionally programmed with a device-specific or a protocol-specific polling command. In one embodiment, the scan-capable device DTM sends a command to each valid address and listens for a response. In another embodiment, the scan-capable device DTM uses a broadcast or multicast command to target a specific address range. In one embodiment, the scan-capable device DTM polls for all devices connected to a particular channel. In another embodiment, the scan-capable device DTM polls for a specific device type, such as valve controller DVC6000, for example. In accordance with yet another embodiment, the scan-capable device DTM may accept user input via an external application or via a user dialogue within the FDT framework and may scan the address range input by the user. The scan-capable device DTM may also display the results of a scan both within the FDT framework and/or via an external application.

In another aspect, the scan-capable device DTM provides a reconnect function to an external application. If the connection with a physical device is lost, the scan-capable device DTM may attempt to recover the connection once the external application attempts to reach the physical device. More specifically, the scan-capable device DTM may store the address of each discovered device and maintain a variable indicative of the state of the connection.

DETAILED DESCRIPTION OF THE DRAWINGS

DETAILED DESCRIPTION

Figure 1:
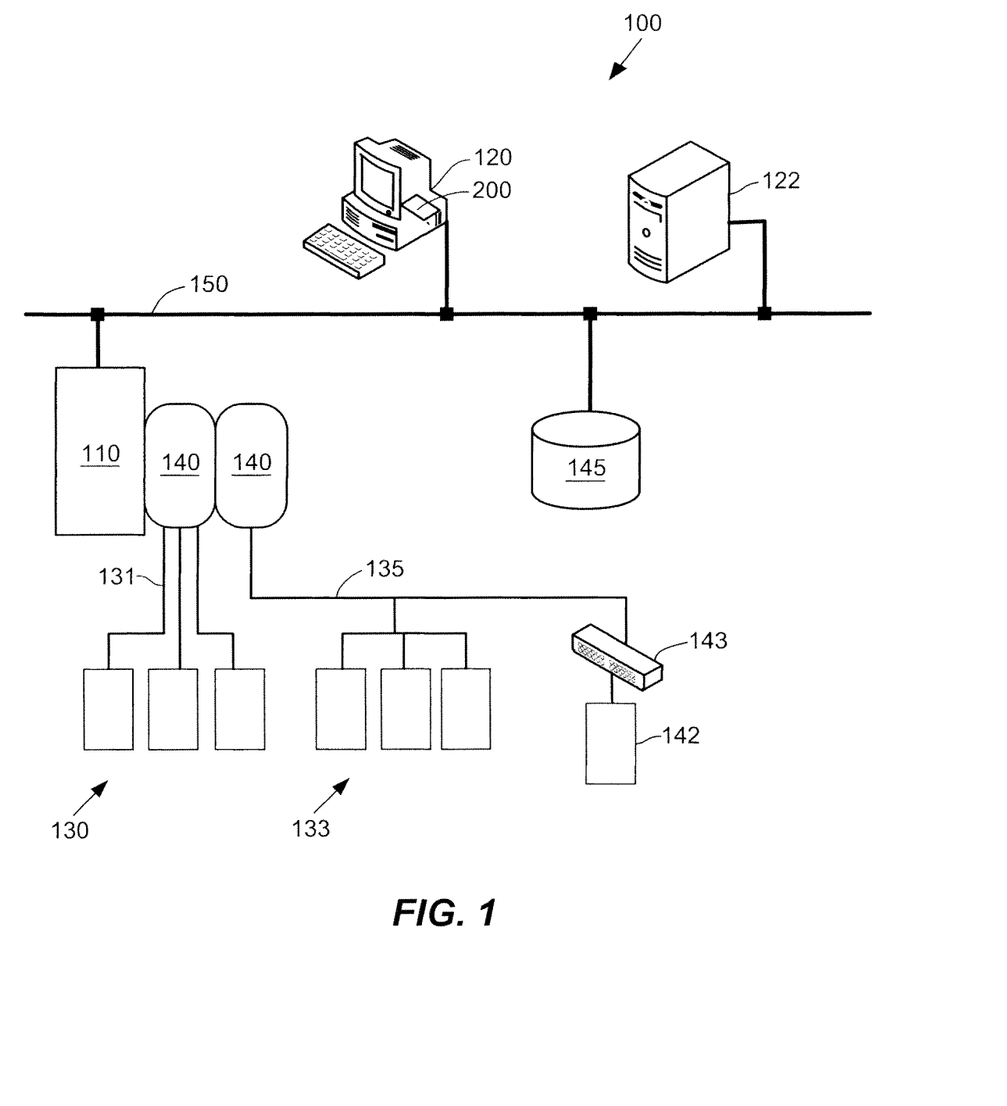
FIG. 1 schematically illustrates a process control system which can be configured and managed using an FDT frame application.

FIG. 1 is a schematic representation of a process control system in which software tools developed on the FDT framework allow operators to view, configure, and otherwise communicate with the elements of the process control system irrespective of the manufacturer- or model-specific parameters of a particular element. More specifically, a process control system 100 includes one or more process controllers 110 communicatively connected to one or more host workstations or computers 120-122 (which may be any type of personal computers, workstations, etc.), at least one having a display screen. Controllers 110 are also connected to field devices 130 via input/output (I/O) cards 140. A data historian 145 may be any desired type of data collection unit having any desired type of memory and any desired or known software, hardware or firmware for storing data and may be separate from or a part of one of the workstations 120-122. The controller 110, which may be, by way of example, the DeltaV™ controller sold by Fisher-Rosemount Systems, Inc., is communicatively connected to the host computers 120-122 via, for example, an Ethernet connection or any other desired communication network 150. The communication network 150 may be in the form of a local area network (LAN), a wide area network (WAN), a telecommunications network, etc. and may be implemented using hardwired or wireless technology. The controller 110 is communicatively connected to the field devices 130 using any desired hardware and software associated with, for example, standard 4-20 mA devices and/or any smart communication protocol such as the FOUNDATION Fieldbus protocol (Fieldbus), the HART protocol, etc.

The field devices 130 may be any types of devices, such as sensors, valves, transmitters, positioners, etc. while the I/O cards 140 may be any types of I/O devices conforming to any desired communication or controller protocol. In the embodiment illustrated in FIG. 1, the field devices 130 are HART devices that communicate over standard analog 4-20 mA lines 131 with a HART modem 140 while the field devices 133 are smart devices, such as Fieldbus field devices, that communicate over a digital bus 135 with an I/O card 140 using Fieldbus protocol communications. Of course, the field devices 130 and 133 could conform to any other desired standard(s) or protocols, including any standards or protocols developed in the future.

Additionally, a field device 142 may be connected to the digital data bus 135 via a gateway 143. For example, the field device 142 may only understand HART commands and the digital data bus 135 may implement the PROFIBUS protocol. To this end, the gateway 143 may provide bidirectional PROFIBUS/HART translation.

The controller 110, which may be one of many distributed controllers within the plant having at least one processor therein, implements or oversees one or more process control routines, which may include control loops, stored therein or otherwise associated therewith. The controller 110 also communicates with the devices 130 or 133, the host computers 120-122 and the data historian 145 to control a process in any desired manner. It should be noted that any control routines or elements described herein may have parts thereof implemented or executed by different controllers or other devices if so desired. Likewise, the control routines or elements described herein to be implemented within the process control system 100 may take any form, including software, firmware, hardware, etc. For the purpose of this discussion, a process control element can be any part or portion of a process control system including, for example, a routine, a block or a module stored on any computer readable medium. Control routines, which may be modules or any part of a control procedure such as a subroutine, parts of a subroutine (such as lines of code), etc. may be implemented in any desired software format, such as using ladder logic, sequential function charts, function block diagrams, object oriented programming or any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. Thus, the controller 110 may be configured to implement a control strategy or control routine in any desired manner.

The workstations 120-122 may execute one or more FDT frame applications, each running in a distributed or non-distributed manner. For example, the workstation 120 may execute storage functions of a particular FDT asset management application while the computer 122 may execute query functions of the same application. Referring again to FIG. 1, an FDT frame application 200 may run on the workstation 120 and may be responsible for asset management. Similarly, the FDT frame application 200 may also control one of the other aspects of plant automation, such as engineering (development, simulation, etc), installation, commissioning, production, or maintenance. It will be further appreciated that the FDT frame application 200 need not be limited to any of the functions listed above and may perform one or more functions made possible by the FDT framework.

Figure 2:
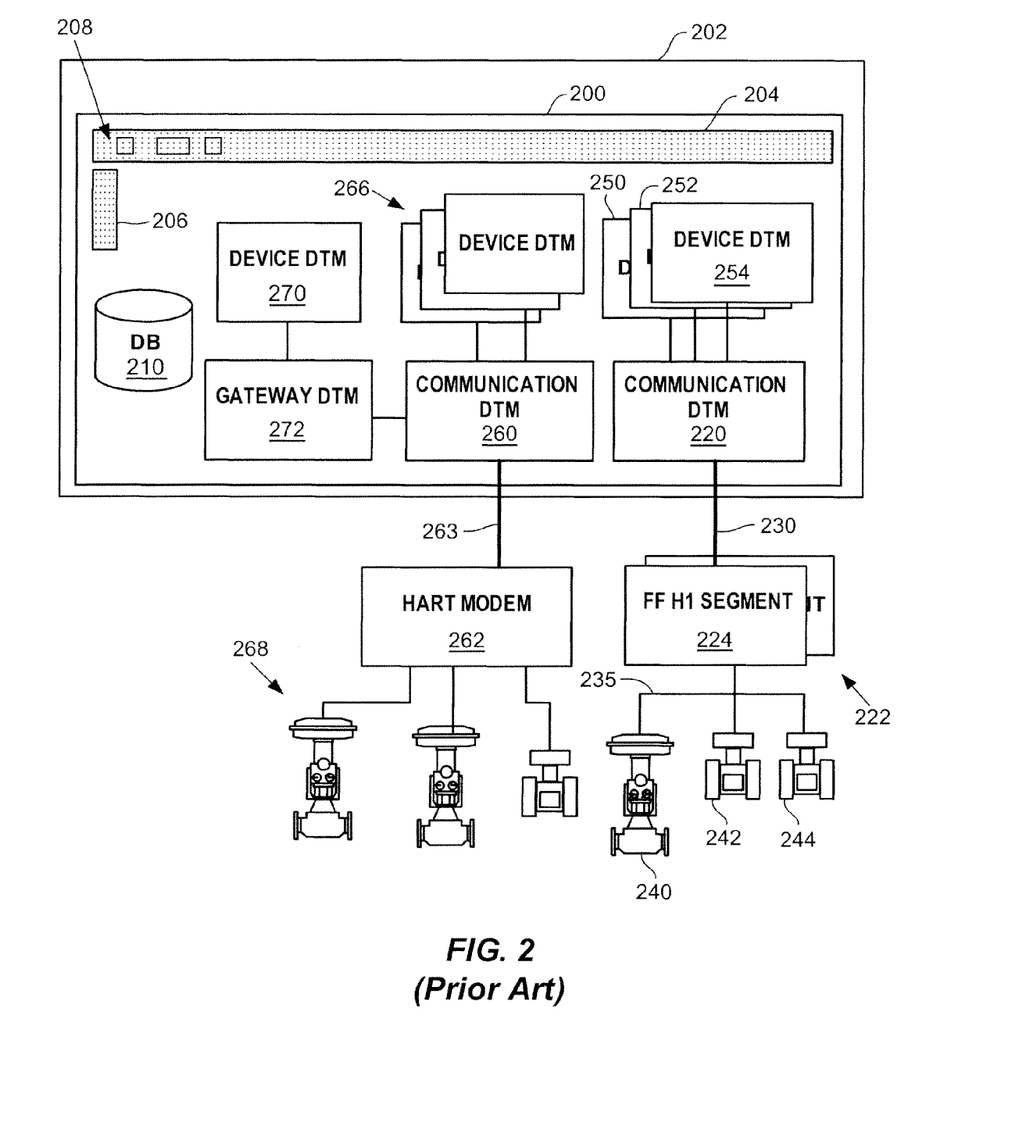
FIG. 2 is a schematic representation of several DTM objects of known types interacting in an FDT framework application.

Referring to FIG. 2, the FDT frame application 200 may run in a distributed or non-distributed manner on a platform 202. In the example above, the platform 202 may be the Windows operating system provided by the workstation 122. However, the platform 202 could, in some embodiments, span several computer hosts such as the workstations 120 and 122 using one of the many approaches to distributed software architecture known in the art. In the example illustrated in FIG. 2, the FDT frame application 200 is implemented using the available methodology and is provided herein by way of example.

The FDT frame application 200 may present a display screen having a menu bar 204, a toolbar 206, and various navigation keys 208. As discussed above, the FDT frame application 200 relies on Microsoft's COM and ActiveX technologies to access the standard Windows graphic interfaces and thus to enable user input from a keyboard, mouse, or other pointing or data entry device. The FDT frame application 200 may also include a database 210 interacting with various FDT objects using the interfaces provided by the FDT specification. Additionally, the FDT frame application 200 may contain several instances of DTM objects. In particular, a communication DTM 220 may be responsible for Foundation Fieldbus (FF) H1 communications on a particular segment available to the physical FF interface 222 of the platform 202. As illustrated in FIG. 2, the FF interface 222 may include several modules, such as computer cards compatible with the Peripheral Computer Interconnect (PCI) standard, for example, or a standalone hardware module. Alternatively, a communication DTM in general and the DTM 220 in particular may correspond to any physical implementation of a communication device or module. In the example discussed herein, the communication DTM 220 corresponds to a hardware module 224 responsible for a particular H1 segment.

In operation, the communication DTM 220 generates and relays commands compliant with the FF H1 protocol to the hardware module 224 via a connection 230. The connection 230 may include standard interfaces provided by the operating system, serial interfaces such as RS232, and other known means of communicating with a peripheral device. The hardware module 224 may communicate with one or more field devices 240-244 via a digital data bus 235, which may be similar to the bus 135. In particular, the field device 240 may have the address $A_1$, the field device 242 may have the address $A_2$, and the field device 244 may have the address $A_3$. When sending or receiving commands and data, the FDT application 200 generally refers to a specific address $A_1$-$A_3$ in order to unambiguously identify the target device. In the known FDT environment, the communication DTM 220 receives a command and an address of a target device connected to the digital data bus 235 from a device DTM corresponding to the target device. Thus, the FDT frame application 200 instantiates a device DTM object 250 corresponding to the field device 240, a device DTM object 252 corresponding to the field device 242, and a device DTM object 254 corresponding to the field device 244.

Each of the conventional device DTM objects 250-254 is configured with the address of the corresponding field device. For example, the device DTM 250 cannot communicate with the corresponding physical device 240 until it acquires the address $A_1$ through explicit configuration. Thus, in the current state of the art, if a certain system has five FF H1 segments with eight devices of a certain type residing on each H1 segment, an FDT application requires at least 40 instances of a device DTM of this type in order to be able to operate or monitor each field device. Referring again to FIG. 2, a communication DTM 260 may correspond to a HART modem 262 and may similarly require as many device DTM 266 instances as there are field devices 268 coupled to the HART modem 262. The communication DTM 260 may communicate with the HART modem 262 over a communication channel 263.

In the example discussed above, each of the conventional device DTMs 250-254 and 266 is instantiated specifically for a protocol supported by the communication DTM to which the device DTM attaches. As indicated above, a device DTM may also be connected to a gateway DTM supporting protocol translation. Referring to FIG. 2, a device DTM 270 corresponding to a field device which supports only PROFIBUS may be connected to a gateway DTM 272 providing PROFIBUS/HART translation. The gateway DTM 272 is, in turn, connected to the communication DTM 260 providing HART communications.

Figure 3:
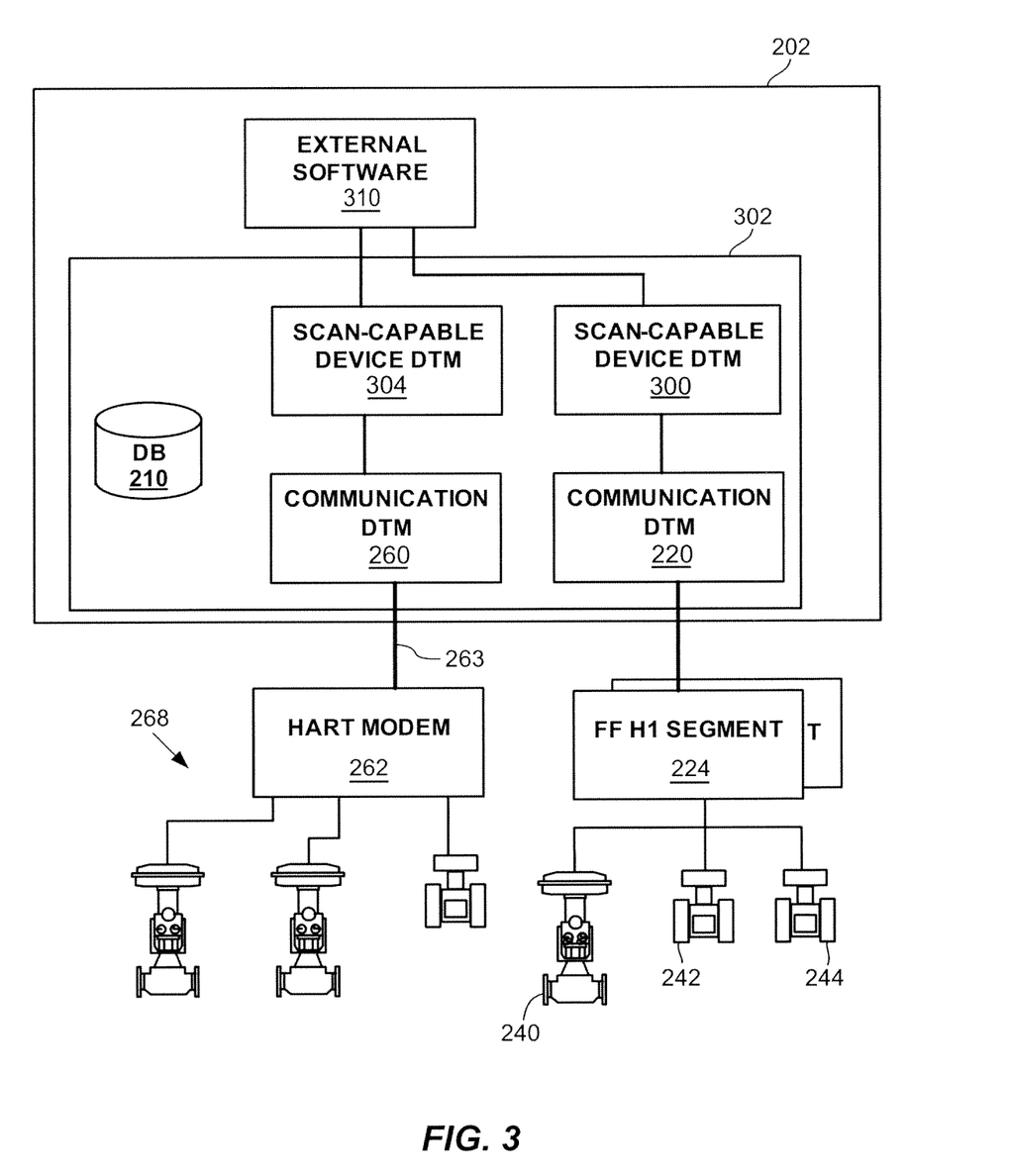
FIG. 3 is a schematic representation of a scan-capable device DTM interacting with a software application running outside an FDT framework and a communication DTM object in the FDT framework.

Referring now to FIG. 3, a scan-capable device DTM 300 of the present disclosure operating in an FDT frame application 302 may interact with an external software module 310 via the interfaces consistent with the current FDT definitions. In another embodiment, the connection between the scan capable device DTM 300 and the external software module 310 extends the FDT specification or relies on a communication scheme outside the scope of FDT; however, the operation of the scan capable device DTM 300 within the FDT frame application 302 is preferably consistent with the FDT specification. The external software module 310 may be, for example, an AMS ValveLink® Software application offered by Emerson Process Management™ as part of the PlantWeb® suite. It will be noted that while FIG. 3 depicts the external software module 310 as belonging to the platform 202, this and other examples of external software discussed below may also run on a different platform or on several platforms in a distributed manner. Because the external software module 310 is not part of the FDT frame application 302, the software module 310 cannot access any of the communication DTMs directly. In general, the FDT frame application 302 is similar to the FDT frame application 200 in that it relies on the standard FDT interfaces and may run on the same OS platform 202. Moreover, the FDT frame applications 200 and 302 correspond to the same configuration of physical devices, such as field devices and modems. Referring again to FIG. 3, the scan capable device DTM 300 may connect to the communication DTM 220 responsible for a certain FF H1 segment.

In operation, the external software module 310 may communicate with a field device 240 by sending device-specific commands. In one embodiment, the external software module 310 is aware of the device-specific parameters and commands and only requires a communication channel to operate the field device 240. For example, the field device 240 may be a digital valve controller DVC6000 and the software module 310 may be AMS ValveLink Software managing the operation of a valve via the DVC6000 controller and providing graphical and text displays to the user. The scan-capable device DTM 300 may be programmed to scan a particular communication channel and report the addresses of devices to the external software module 310. In another embodiment, the scan-capable device DTM 300 may store the addresses of the discovered devices, assign logical identifiers (or nicknames) to each discovered device, report the identifiers to the software module 310, and route data on behalf of the software module 310. In this case, the software module 310 may still need to know whether any devices of the desired type have been successfully located but may not require the physical addresses of the devices or other particulars of the network topology. In other words, the scan-capable device DTM 300 may route data between one or more field devices and the software module 310.

Specifically in reference to FIG. 3, the scan-capable device DTM 300 may be an instance of a scan capable device DTM class programmed to interact with a communication DTM of a specified protocol type. The scan capable device DTM 300 may be instantiated to work specifically with the FF H1 protocol while a scan capable device DTM 304 may be an instance of the same class instantiated to work with the HART protocol. In another embodiment, the scan-capable device DTMs 300 and 304 may be instantiated from separate classes, each class developed specifically for a certain protocol. To this end, the scan-capable device DTM 300 or 304 may include a scan function responsible for carrying out one or several scanning, or "discovery," operations on a specified communication link (e.g., an electrical line, a logical channel, a bus, etc.). The corresponding device manufacturer or other supplier of the scan-capable device DTM 300 or 304 may provide the scan function as an integral component of the DTM 300 or 304. Alternatively, the scan function may be provided as a plug-in component compatible with a certain device DTM so that the device DTM may acquire scan capability by including the plug-in component.

The scan function may be adapted to know certain specific aspects of the protocol over which the corresponding instance of a scan-capable DTM carries out its scanning operation. For example, the scan function of the scan-capable device DTM 304 may be programmed to send a HART command 0 to the communication DTM 260. As one familiar with HART will recognize, this command may accept either a short or a long HART address and, if properly delivered to a HART device, cause the HART device to reply with device identification. In other embodiments, the scan function may send another command or a series of commands for the purposes of discovering HART devices on a particular channel, such as the communication channel 263. Generally speaking, the scan function may scan for alerts, poll sensors (e.g., primary sensors), request state information, or carry out a similar non-intrusive or minimally intrusive operation in order to discover field devices. In some embodiments, the scan function polls devices and obtains additional useful information, such as the status of the device, at the same time. In yet other embodiments, the scan function may have little or no knowledge of the one or several protocols supported by the communication DTM 260, and may scan the communication link or channel by sending high-level commands to the communication DTM 260. The communication DTM may accordingly forward these commands to physical devices, as well as forward the corresponding responses to the scan-capable device DTM 304.

Referring again to FIG. 3, the scan capable DTM 304 may report the list of devices to the external software module 310 upon completion of the device discovery operation by the scan function. The scan capable DTM 304 may be programmed to discover devices of any type on a particular channel. The external software module 310 may display the list of devices and, optionally, the status of each discovered device to the user and may subsequently accept commands for a specific device. As discussed above, the external software module 310 may exchange data with each discovered field device via the scan-capable device DTM 300 or 304 by specifying the address of the device reported from the DTM 300 or 304 or a nickname assigned by the DTM 300 or 304. In this manner, a single instance of a scan-capable device DTM, such as the DTM 304, can automatically discover the devices available on the communication channel 263 and can further enable communication with each of the multiple devices 268. A scan-capable device DTM implemented according to the teachings of the present disclosure can thus eliminate the need to instantiate a separate device DTM object for each device, as well as the need to request address information from the user.

Alternatively or additionally, the external software module 310 may specify a device type, manufacturer identity, and other similar parameters to the scan capable DTM 304 or 300. In the HART communication protocol, for example, each device is associated with a manufacturer identifier such as Fisher Controls and device type such as DVC5000. The scan-capable DTM 304 or 300 may then perform a scan of the communication channel in a manner similar to the embodiment discussed above and may additionally filter the list of discovered devices according to the device type, manufacturer type, or a combination thereof. In one contemplated embodiment, the scan capable DTM 304 or 300 may search for all devices of a certain type and report the discovered devices to the external software module 310 irrespective of the manufacturer identity parameter associated with each device. In another embodiment, the scan capable DTM 304 or 300 may discover all devices having a manufacturer identity matching a parameter specified by the external software module 310. As yet another alternative, the search criteria such as manufacturer identity or device type may be programmed directly into the scan capable DTM 300 or 304. In this case, the external software module 310 need not communicate any parameters to the scan capable device DTM 300 or 304.

Figure 4:
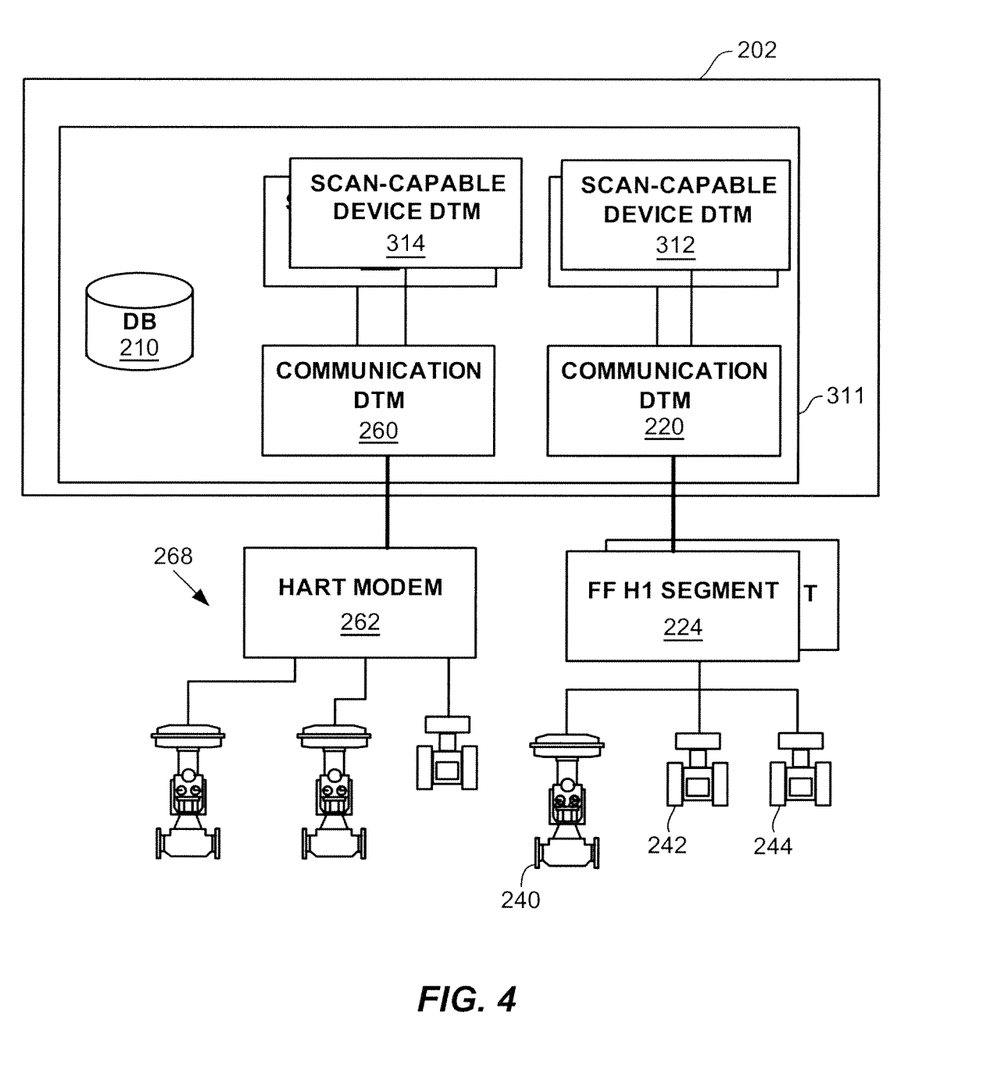
FIG. 4 is a schematic representation of a single scan-capable device DTM managing several physical devices via a communication DTM.

FIG. 4 illustrates another contemplated embodiment of a scan-capable device DTM. In this exemplary implementation of an FDT frame application 311, a scan capable device DTM 312 performs all of the functionality associated with a device DTM in any FDT framework. In particular, the scan capable DTM 312 may contain data and functions specific to the field devices 242 and 244 and may interact with the graphical environment provided by FDT frame application 311. Similarly, a scan capable device DTM 314 may contain device-specific information corresponding to one or more devices connected via the HART modem 262. The scan capable DTM 312 does not require that the addresses of the field devices 242 and 244 be explicitly provided. Instead, the scan capable DTM 312 scans the communication channel in a manner similar to the DTMs 300 or 304 and automatically discovers field devices of a matching type. Once the discovery is complete, the scan capable DTM 312 may communicate with both field devices 242 and 244. However, in other embodiments it may be desirable to create a separate instance of a scan capable DTM 312 for each device in order to simplify device management in the FDT environment, for example. In one contemplated embodiment, a separate instance of a scan capable DTM 312 may be created for each automatically discovered field device and associated with the address of the discovered field device. The FDT frame application 311 may display device description, physical address, and other relevant information for each discovered device to a user via the standard FDT interfaces.

Similar to the embodiment illustrated in FIG. 3, the user may be additionally provided with options related to device discovery, such as manufacturer identity and device type. The FDT frame application 311 may provide these and other options via the standard FDT graphical and user interfaces. One skilled in the art will appreciate that for some applications, such as asset management, a complete list of all devices attached to a specified communication line or bus may be of interest while other applications, such as valve control, may be interested in a specific device type. Thus, various device discovery options may be preferable in different FDT frame applications 302 or 311 or external software applications 310.

Figure 5:
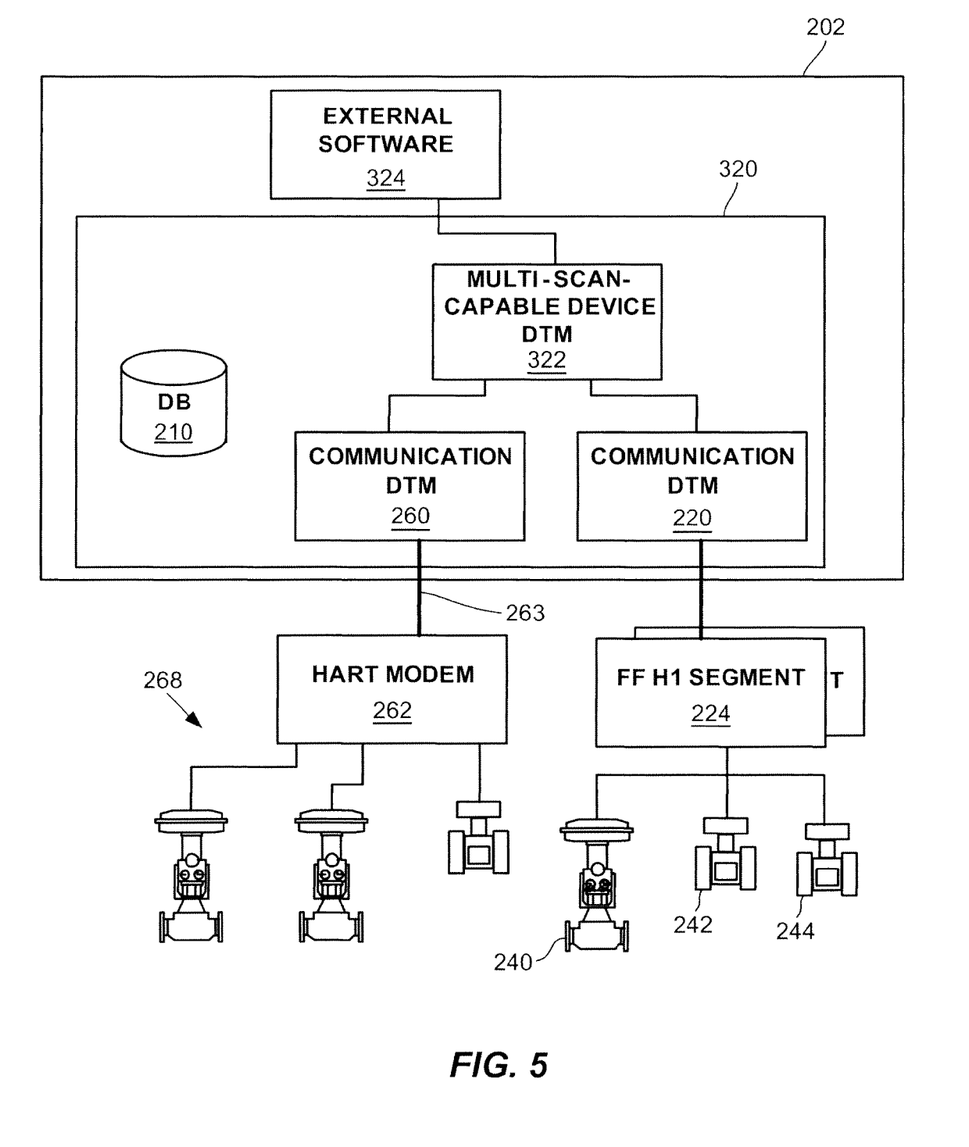
FIG. 5 is a schematic representation of a scan-capable device DTM interacting with a software application running outside an FDT framework and several distinct communication DTM objects in the FDT framework.

Referring now to FIG. 5, an FDT frame application 320 may contain a multi-scan-capable DTM 322 interacting with external software 324. It is contemplated that in accordance with a possible extension of the existing FDT specification, a single instance of device DTM may be capable of interacting with multiple instances of communication DTMs. As illustrated in FIG. 5, the multi-scan capable DTM 322 communicates with the HART communication DTM 260 and with the FF H1 communication DTM 220. In accordance with this contemplated embodiment, the DTM 322 may also communicate with other communication DTMs supporting HART, FF, PROFIBUS, or other protocols. In this embodiment, the DTM 322 may contain a scan function performing a nested search. Specifically, the scan function of the DTM 322 may step through each of the communication DTMs to which the DTM 322 is connected, identify and establish a communication with the available field devices, and report the results of discovery to the external software 324.

Figure 5A:
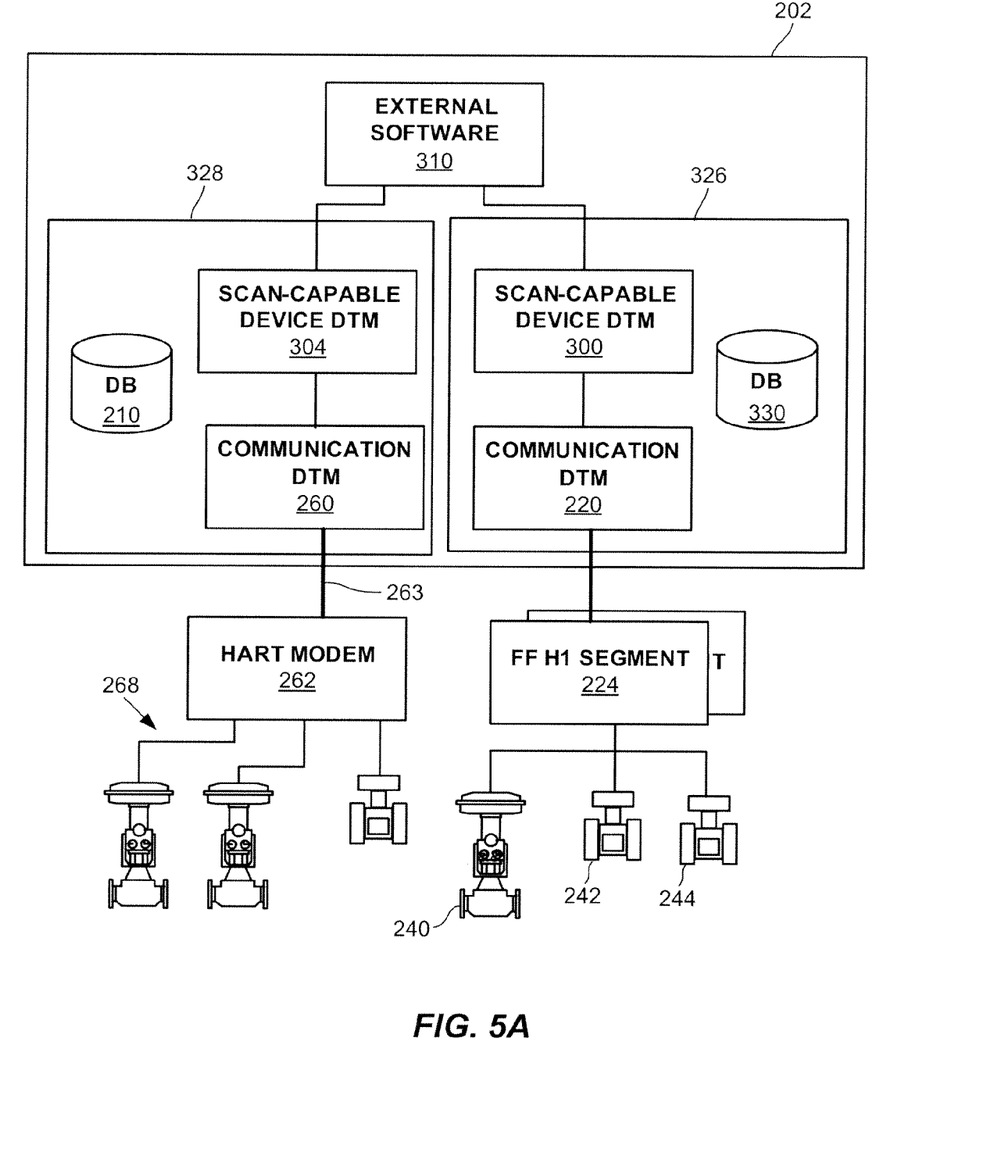
FIG. 5A is a schematic representation of a software application running outside an FDT framework and interacting with multiple scan-capable device DTM objects instantiated in separate FDT frame applications.

FIG. 5A illustrates another contemplated embodiment in which multiple FDT frame applications 326 and 328 run concurrently on the platform 202. Both of the FDT frame applications 326 and 328 may interact with the external software module 310. Both FDT frame applications 326 and 328 may be autonomous and may, for example, maintain separate databases 210 and 330. The FDT frame application 326 may primarily support FF communications and may be responsible, in part, for managing the FF H1 segment 224 via the communication DTM 220. Meanwhile, the FDT frame application 328 may be responsible for HART communications and may manage the HART modem 262 via the communication DTM 260. Similar to the embodiment discussed above in reference to FIG. 3, the scan-capable device DTM 300 may discover, report, and manage field devices via the communication DTM 220 and the scan-capable device DTM 304 may manage HART devices via the communication DTM 260. Of course, each of the FDT frame applications 326 and 328 may have multiple scan-capable DTMs responsible for separate FF H1 segments, HART modems, and other communication channels. Moreover, the external software module 310 may be adapted to be equally compatible with a single or multiple FDT frame applications responsible for different or similar communication lines. In this sense, the connections between FDT frame applications and external software such as the software module 310 may be transparent to the user during installation, configuration, or operation of the external software module 310.

In yet another embodiment, the external software module 310 or a similar software application operating outside an FDT framework may communicate with several FDT frame applications operating on separate physical hosts. For example, the workstation 120 may run the FDT frame application 326 while the workstation 122 may run the FDT frame application 328. Each of the workstations 326 and 328 may run a different version of the Windows OS or, in a possible extension of FDT, another operating system adapted to support the FDT specification. The external software module 310 may run on the workstations 120 and 122 in a distributed manner. In another embodiment, the external software may run on a single intelligent host or a workstation, such as the workstation 120. In this and similar cases, the external software module 310 may communicate with the FDT frame applications using TCP/IP or UDP/IP sockets, remote procedure calls (RPCs), or other suitable means of remote inter-process communication. In another embodiment, both the external software module 310 and the FDT frame applications 326 and 238 may rely on the Distributed Component Object Model (DCOM) technology to exchange data.

In general with respect to FIGS. 3, 5 and 5A, the scan-capable device DTM 300 or 304, as well as the multi-scan-capable device DTM 322, may be additionally adapted to reconnect the external software module 310 or 324 to the corresponding field device once the connection via the scan-capable DTM is lost. More specifically, a scan-capable device DTM may store the address of each discovered device, thus eliminating the need to re-run the scan function each time one or more device connections is lost. Also referring to FIGS. 3 to 5A in general, it should be noted that a scan-capable device DTM or a multi-scan-capable device DTM may connect to a communication DTM via a gateway DTM. For example, the scan-capable device DTM 300 may connect to the communication DTM 220 via a DTM of type gateway which provides PROFIBUS/FF H1 translation.

Figure 6:
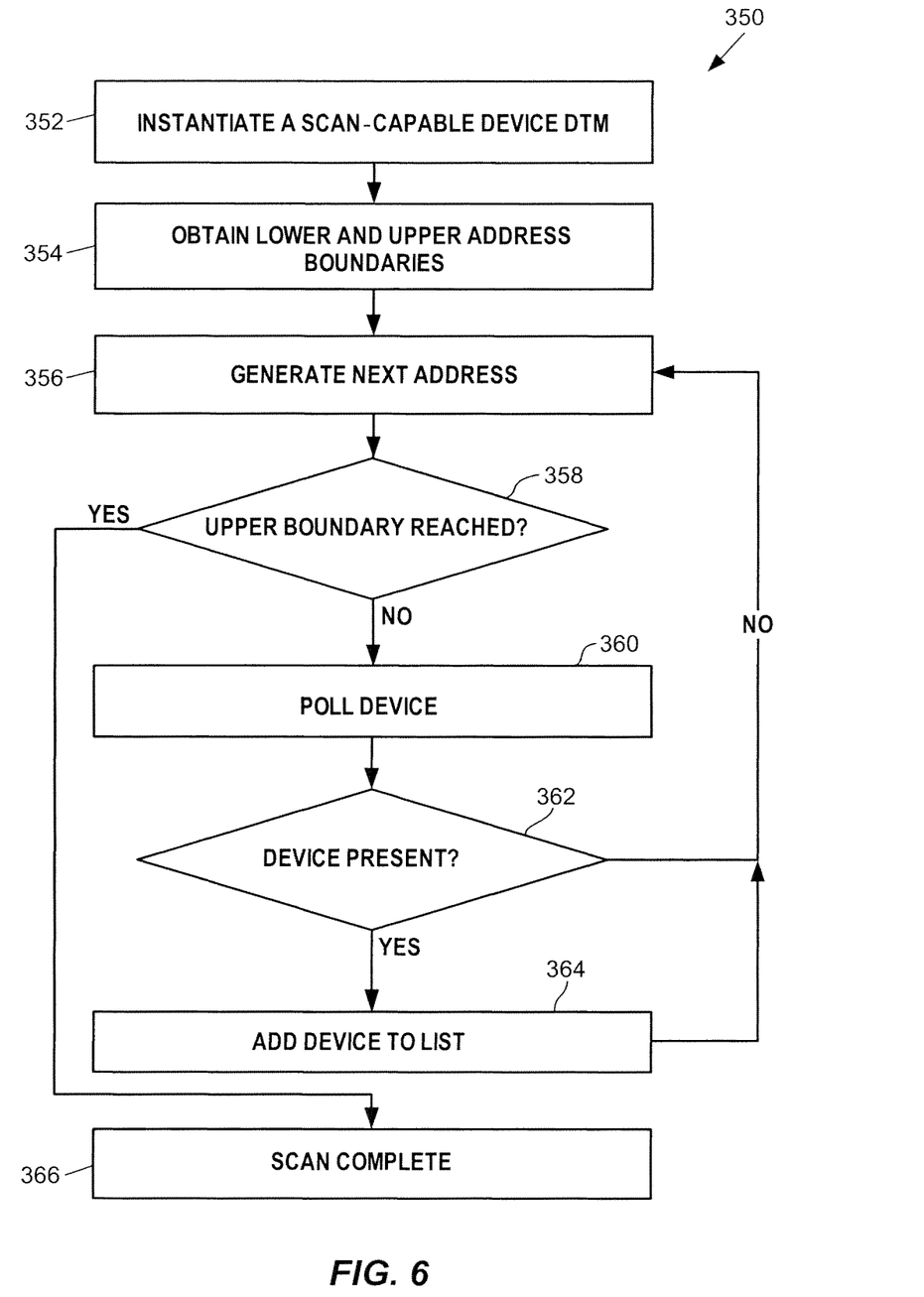
FIG. 6 illustrates an exemplary procedure which a scan-capable device DTM may execute as part of a device scanning process.

FIG. 6 illustrates a block diagram of a procedure 350 which may be executed by the scan-capable device DTM 300, 304, 312, or 314. In a block 352, an instance of a scan-capable device DTM is created and initialized inside an FDT frame application. As discussed above, a single instance of a scan-capable device DTM may concurrently support several field devices, provided that the scan-capable device DTM is programmed or configured with enough device-specific information. The instantiated scan-capable device DTM may connect to an appropriate communication DTM as part of an initialization sequence executed in the block 352. In a block 354, the procedure 350 obtains the boundaries of an address range associated with a particular multiplexer, FF H1 segment, or similar connection. The procedure 350 may receive the address boundaries from an external software operating outside the FDT frame application. Alternatively, the procedure 350 may obtain address boundaries from the FDT frame application via the standard FDT interfaces. As yet another alternative, the device boundaries may be supplied as a list and may contain several non-overlapping address ranges. However, the exemplary procedure 350 refers to the embodiment supporting a single range of addresses demarcated by only two addresses.

Next, the procedure 350 may step through each address in the specified range in an attempt to reach a physical device at each address. In a block 356, the procedure 350 may generate a next address by incrementing a previously attempted address or the lower boundary of the range, for example. In a block 358, the procedure 350 may check whether the next address has exceeded the upper boundary of the specified address range. If the next address is within the specified range, the procedure 350 may detect the presence or absence of a physical device at the next address. In particular, the procedure 350 may execute a polling function according to one of the embodiments discussed above.

If, in a block 362, the procedure 350 discovers a physical device, the procedure 350 may add the address of the discovered device to a list. This step is illustrated in a block 364. As indicated above, the procedure 350 may also obtain additional information such as the operational state of the device, a list of outstanding alarms generated by the device, outstanding measurements collected by the device, and similar data. The procedure 350 may store this information for each discovered device along with the physical address of the discovered device. A scan-capable device DTM executing the procedure 350 may then make this collected information available to an external software application or to the FDT frame application which may, in turn, display this information graphically or textually. Finally, the procedure 350 may report the completion of the scan to the external software or to a user working with the FDT frame application in a block 366.

Figure 7:
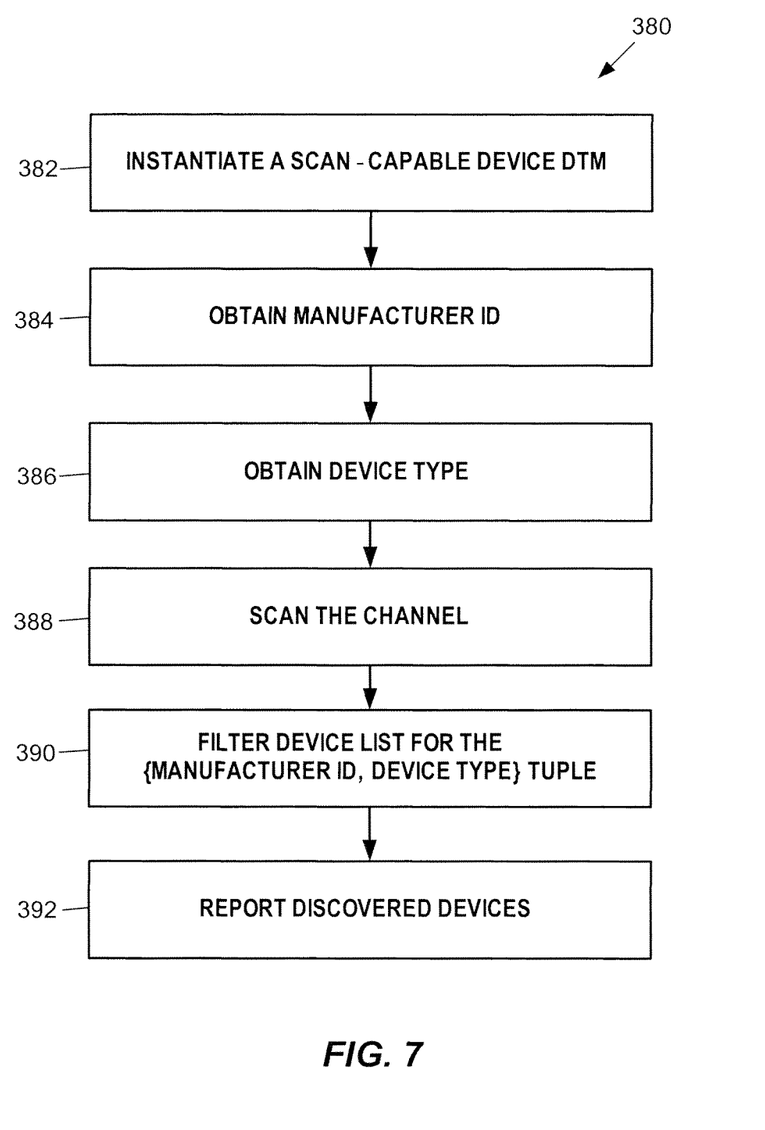
FIG. 7 illustrates another exemplary procedure which a scan-capable device DTM may execute as part of a device scanning function in order to find devices of a specified type.

Moving on to FIG. 7, a procedure 380 may correspond to another contemplated embodiment of a scan-capable device DTM. The scan-capable device DTM may be similarly instantiated in a block 382. In a block 384, the procedure 380 may obtain a manufacturer identity in order to match this identity with the information reported by each physical device present on a certain communication channel. Next, the procedure 380 may obtain a device type in order to further narrow the search for one or more matching devices. Of course, other embodiments of the procedure 380 may obtain only one of the manufacturer identity or device type.

In a block 388, the procedure 380 may scan the communication channel to discover physical devices. In this embodiment, the procedure 380 obtains a complete list of physical devices and filters out the obtained list in a block 390. In other words, the procedure 380 may send a generic command through the communication DTM to which the scan-capable DTM is attached and, once every available device responds with sufficient identity and type information, the procedure 380 may compare the information from each device to the criteria obtained in the blocks 384 and 386. Alternatively, the procedure 380 may know, at least in some cases, a command specific to the device type or to the manufacturer specified in the blocks 384 and 386. In this case, the procedure 380 may reduce the amount of traffic on the communication channel by broadcasting, multicasting, or iteratively sending out a command to each possible address expecting only those devices to respond that match the specified device type or manufacturer identity. Finally, the procedure 380 may report the information available about each discovered device to an external software or to an FDT frame application in a block 392.

In the embodiments discussed above, the scan function may be automatically triggered by a scan-capable DTM upon instantiation or initialization or, alternatively, by a user interacting with an FDT frame application or an external software. In particular, the external software module 310 may present a "SCAN ALL" function to the user. The "SCAN ALL" function may be triggered by a radio button, a command entered from a text prompt, a voice command, or by any other means of presenting user interface. Once selected, the "SCAN ALL" function may trigger scanning in each scan-capable device DTM of every FDT frame application on every host, provided the external software module 310 has established a connection with this scan-capable device DTM. The external software module 310 may then collect the desired information from each scan-capable DTM.

It will be appreciated that other embodiments consistent with the teachings of the present disclosure may combine some of the elements of the procedures 350 and 380 in order to search for devices of a specified type that also belong to a specified address range, for example. Also, it will be noted that although the embodiments discussed above refer to the current FDT specification, the principles and algorithms outlined above also apply to other versions of FDT, including those that may be developed in the future, as well as to similar frameworks for supporting communication between a software module and a physical device. In particular, the FDT framework may adopt a platform other than the Windows OS. Consequently, FDT may employ other technologies instead of or in addition to COM and ActiveX and may also redefine some of the interfaces used by frame applications and DTMs. It should be noted that the embodiments discussed above are consistent with other platforms and interface definitions.

From the foregoing discussion, one of ordinary skill in the art will appreciate that a scan-capable device DTM (such as the scan-capable device DTM 300, 304, 312, 314, or 322) allows a developer or user of an FDT frame application to instantiate a DTM object that both encapsulates functionality specific to a particular device and provides communications between this device and a software module without an explicit configuration of the DTM object with the address of the device. In other words, a scan-capable device DTM significantly simplifies configuration and management of devices in an FDT framework and reduces the probability of human error by either entirely eliminating the step of configuring a device DTM with a corresponding address or, in other scenarios or embodiments, by presenting a list of discovered devices and/or addresses to a user. Moreover, some embodiments of a scan-capable device DTM allow a software module to communicate with multiple physical devices via a single instance of the scan-capable device DTM. Thus, by representing one or several physical devices in a software framework, the scan-capable device DTM provides a high level of abstraction particularly convenient for efficiently managing complex systems (e.g., a process control plant having hundreds of field devices).

Further, some embodiments of a scan-capable device DTM allow a single instance of the scan-capable device DTM to support communications between software (which may include one or several modules internal or external to the FDT framework) and multiple devices connected to several communication links of different types. A DTM including this functionality may also be referred to as a multi-scan capable DTM. As discussed above, a multi-scan capable DTM may further reduce the number of DTM objects in an FDT frame application. Moreover, a multi-scan capable DTM provides a discovery function that is not limited to a single communication link or even to a single communication protocol.

Although the foregoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A method of communicating with a field device using a Field Device Tool (FDT) framework, wherein the field device operates in a process control environment and is communicatively coupled to a communication link, the method comprising:
provide a scan capable device type manager (DTM) of type device, wherein the scan capable DTM of type device i) represents the field device in the FDT framework and ii) includes a scan function configured to scan the communication link;
using the FDT framework to generate an instance of the scan capable DTM of type device;
communicatively connecting the instance of the scan-capable DTM of type device to a communication channel, wherein the communication channel is operatively coupled to the communication link;
using the scan function to scan the communication link to automatically obtain an address of the field device at the instance of the scan-capable DTM of type device, wherein scanning the communication link includes obtaining at least one of a device type or a manufacturer identity corresponding to the field device and discovering the field device according to the at least one of the device type or the manufacturer identity;
connecting the instance of the scan capable DTM of type device to a frame application; and
enabling communications between the field device and the frame application via the instance of the scan-capable DTM of type device using the address of the field device.

2. The method of claim 1, further comprising:
storing the address of the field device in a memory;
retaining the stored address in the memory if the communication link becomes unavailable; and
restoring the communication link between the field device and the frame application using the stored address in response to the communication link becoming available.

3. The method of claim 1, wherein connecting the instance of the scan capable DTM of type device to a communication channel includes connecting the instance of the scan capable DTM of type device to a communication DTM, wherein the communication DTM supports a communication protocol associated with the communication link.

4. The method of claim 3, wherein scanning the communication link includes:
sending a message to the communication DTM, wherein the message includes a command addressed to the field device; and
receiving a response from the field device, wherein the communication DTM forwards the response from the field device to the scan capable DTM of type device.

5. The method of claim 1, wherein scanning the communication link further includes obtaining an address range; and wherein scanning the communication link further includes discovering the field device having the address within the address range.

6. The method of claim 1, wherein scanning the communication link includes at least one of polling sensors or scanning for alerts at each address available on the communication link.

7. The method of claim 1, wherein scanning the communication link includes sending at least one of a broadcast or a multicast message to a plurality of addresses associated with the communication link.

8. The method of claim 1, wherein the communication link supports a digital communication protocol; wherein scanning the communication link includes sending a device identification command of the digital communication protocol to each available address, wherein the device identification causes a field device at the available address to reply with device identification.

9. The method of claim 1, further comprising obtaining a status of the field device.

10. The method of claim 1, wherein the field device is a first field device, the method further comprising:
scanning the communication link to discover a second field device; and
determining an address of the second field device at the scan capable DTM of type device, wherein the address of the first field device is distinct from the address of the second field device.

11. The method of claim 1, wherein the field device is a first field device, the method further comprising:
connecting the instance of the scan capable DTM of type device to a second communication channel, wherein the second communication channel corresponds to a second communication link;
scanning the second communication link to discover a second field device communicatively coupled to the second communication link; and
obtaining an address of the second field device at the scan capable DTM of type device.

12. The method of claim 1, further comprising enabling communications between the field device and a software module via the instance of the scan capable DTM of type device without configuring the instance of the scan capable DTM of type device with the address of the field device.

13. A scan capable device type manager (DTM) of type device operating in a Field Device Tool (FDT) application framework, wherein the scan capable DTM of type device represents at least one field device operating in a process control environment, the scan capable DTM of type device comprising:
a function module arranged to execute one or more device-specific functions of the at least one field device;
a first interface coupled to the function module, the first interface arranged to interact with the application framework;
a second interface coupled to the function module, the second interface arranged to interact with a communication channel, wherein the communication channel corresponds to the communication link to which the at least one device is communicatively coupled;
a memory to store at least one of a device type, a manufacturer identity, or an address range;
a scan function coupled to the second interface, the scan function configured to scan the communication link to discover the at least one field device coupled to the communication link and to enable communication between the application network and the at least one field device discovered via the scan capable DTM of type device, wherein the at least one field device matches the stored at least one of the device type, the manufacturer identity, or the address range.

14. The scan capable DTM of type device of claim 13, further comprising a persistent memory to store the address of the at least one field device.

15. The scan capable DTM of type device of claim 13, wherein a communication DTM operating within the FDT application framework provides the communication channel.

16. The scan capable DTM of type device of claim 13, wherein the second interface is further coupled to a second communication channel that corresponds to a second communication link to which the at least one field device is coupled; wherein the first communication link supports a first communication protocol and the second communication link supports a second communication protocol; and wherein the scan function is coupled to the second interface to further discover the at least one field device coupled to the second communication link.

17. The scan capable DTM of type device of claim 16, wherein the first communication link supports a first digital communication protocol and the second communication link supports a second digital communication protocol.

18. The scan capable DTM of type device of claim 13, wherein the function module performs at least one of a calibration, diagnostic, maintenance, or test function.

19. A method of communicating with a field device of a specific field device type, wherein the field device operates in a process control network, the method comprising:
generating an instance of a scan capable device type manager (DTM) of type device in a Field Device Tool (FDT) application framework, wherein the scan capable DTM of type device represents at least one device of the specific field device type in the FDT framework;
connecting the instance of the scan-capable DTM of type device to a communication channel associated with a communication protocol;
receiving, from a user interface, a manufacturer identity associated with the field device; and
using the scan capable DTM of type device to scan a plurality of addresses associated with the communication channel to discover one or several field devices matching the specific field device type and the received manufacturer identity.

20. The method of claim 19, further comprising enabling communication between the one or several field devices and at least one of a process control application or an asset management application associated with the FDT application framework.

21. The method of claim 19, further comprising:
generating a list of discovered field devices, wherein each list entry includes at least an address of a discovered field device; and
sending the list to a user interface via the FDT application network.

22. The method of claim 19, further comprising receiving an address range from the user interface, wherein each of the plurality of addresses scanned by the scan capable DTM of type device is within the address range.

23. The method of claim 19, further comprising:
assigning a nickname to each discovered field device;
providing the nickname of each discovered field device to an application associated with the FDT application framework; and
routing data between the application and each discovered field device based on the assigned nickname.

* * * * *

UNITED STATES PATENT AND TRADEMARK OFFICE
CERTIFICATE OF CORRECTION

PATENT NO. : 8,543,741 B2  
APPLICATION NO. : 12/192874  
DATED : September 24, 2013  
INVENTOR(S) : Connor W. Reynolds et al.

It is certified that error appears in the above-identified patent and that said Letters Patent is hereby corrected as shown below:

In the Specification

At Column 5, line 34, "DETAILED" should be -- BRIEF --.

Signed and Sealed this
Thirtieth Day of June, 2015

Michelle K. Lee
*Director of the United States Patent and Trademark Office*